Feb. 24, 1970
F. T. GIBBINGS
3,496,753
METHOD OF MAKING WHEEL TRIM OR COVERS
Filed Oct. 3, 1966
3 Sheets-Sheet 1
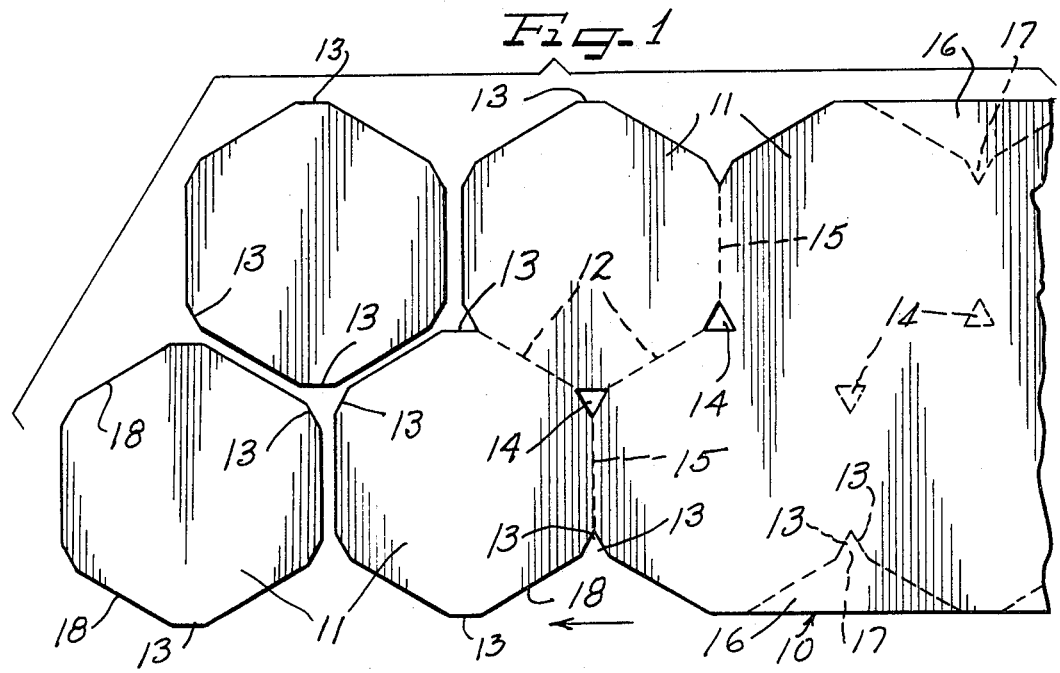
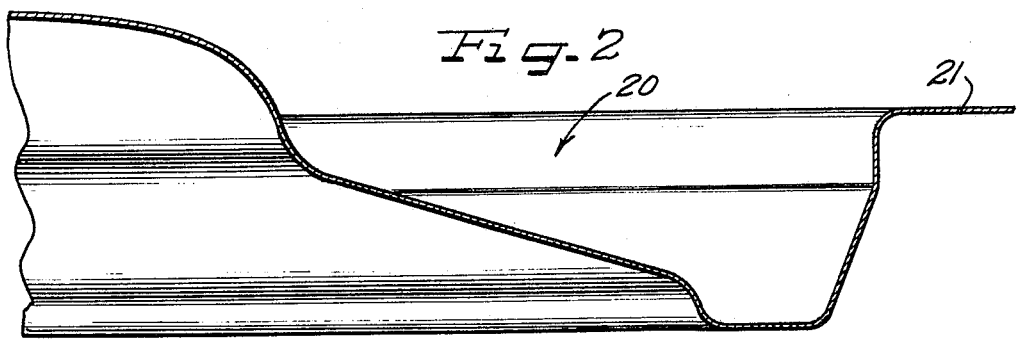
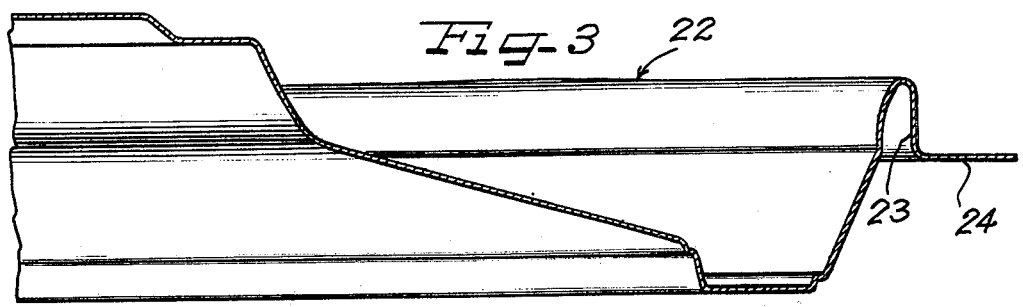
INVENTOR.
Fred T. Gibbings
BY *Hill, Sherman, Meroni, Gross & Simpson*
ATTORNEYS

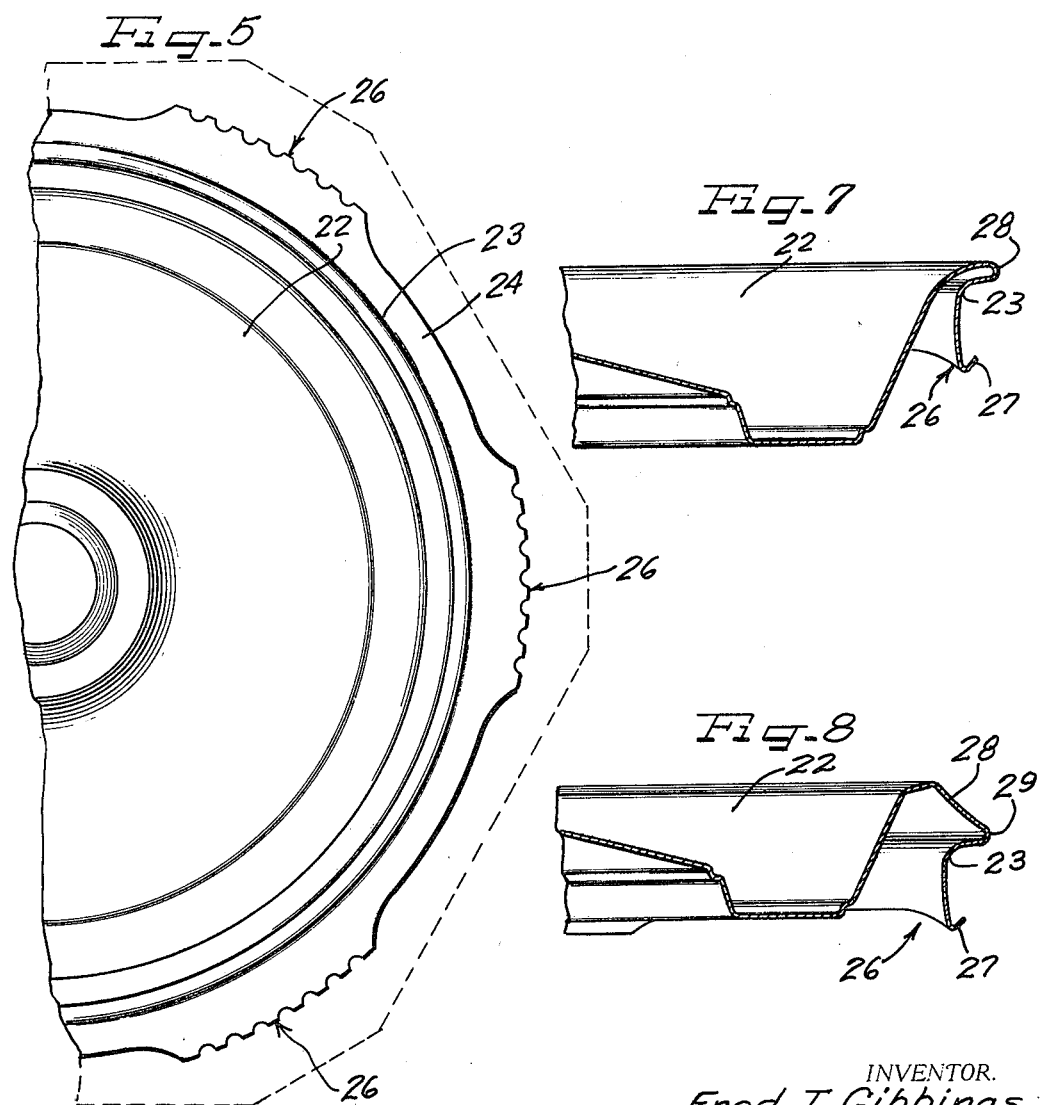

Feb. 24, 1970  F. T. GIBBINGS  3,496,753
METHOD OF MAKING WHEEL TRIM OR COVERS
Filed Oct. 3, 1966  3 Sheets-Sheet 3
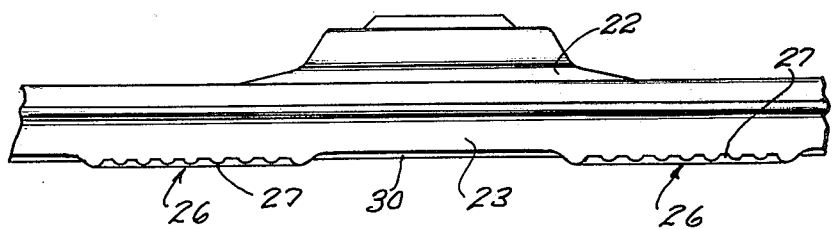
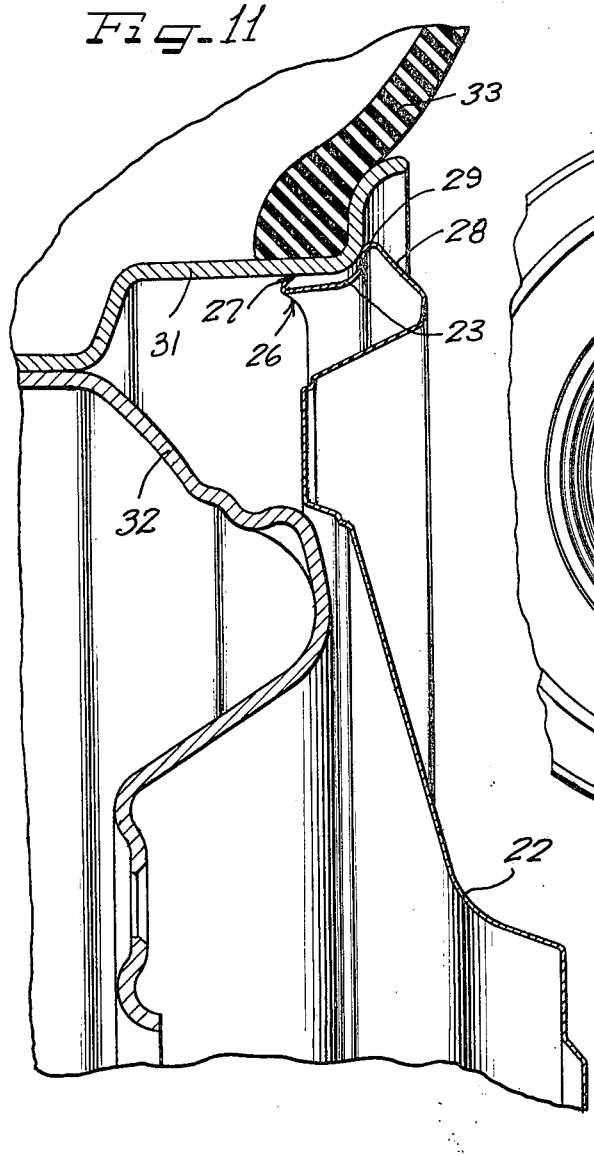
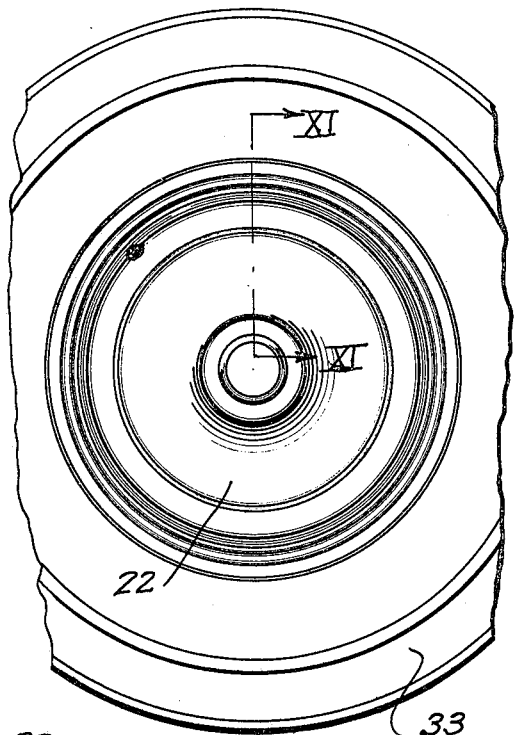
INVENTOR.
Fred T. Gibbings
BY *Hill, Sherman, Meroni, Gross & Simpson*  ATTORNEYS United States Patent Office 3,496,753
Patented Feb. 24, 1970

3,496,753
METHOD OF MAKING WHEEL TRIM OR COVERS
Frederick T. Gibbings, Bloomfield Hills, Mich., assignor to North American Rockwell Corporation, a corporation of Delaware
Filed Oct. 3, 1966, Ser. No. 583,729
Int. Cl. B21d 53/32
U.S. Cl. 72—339     3 Claims

ABSTRACT OF THE DISCLOSURE

A method of forming a wheel cover including the steps of cutting multiple blanks of polygon shape with cut-off corners from a sheet of resilient metal with minimum waste and forming the blanks into wheel covers having equally spaced groups of fingers located at the cut-off corners and relatively deep flange portions interconnecting the groups of fingers.

---

This invention pertains to the manufacturing of so-called ornamental wheel trim or covers for application to outer sides of vehicle or automobile wheels.

An object of this invention is to provide an improved method of manufacturing wheel covers such as that disclosed in Patent No. 2,624,634 issued Jan. 6, 1953 to George Albert Lyon.

It is the aim of this invention to provide a method of manufacturing wheel covers similar to that shown in George Albert Lyon Patent No. 2,707,449 wherein wheel covers are drawn from strip or coiled stock, but which enables the blanking, with a minimum of waste, of generally hexagonally shaped blanks from a common strip, and from each of which blanks a cover may be very economically manufactured with spaced cover retaining fingers each located in the general locale of the corners of the blank.

Still another object of the invention is to provide a method of manufacturing wheel covers which may be in the form of so-called full wheel disks or rings, and wherein the retaining fingers are so located as to enable a substantially equal distribution of the stress in the application of the cover to a wheel, and which minimizes the likelihood of collapsing or buckling of the flange carrying the fingers as they are stressed.

Still another object of this invention is to provide a method of manufacturing wheel covers wherein the formation of the cover retaining flange and the location of the fingers integrally formed therewith are such that the fingers will be so stressed in use as to resist turning of the cover relative to a wheel with which the cover is engaged.

In accordance with the general features of this invention, there is provided in a method of forming wheel trim or covers the steps of cutting from a strip parallel rows of interlocked staggered polygonal shaped blanks along a zigzag medial line in the strip and including the notching out of staggered spaced edge portions of the strip, and cutting out of relatively small triangular sections at the peaks of the zigzag line and whereby the ensuing blanks are generally of hexagonal shape with cut-off corners.

Another feature of the invention relates to forming the peripheral portion of each blank into an underturned continuous flange with at least six circumferentially spaced groups of generally radially outwardly inclined cover retaining fingers generally at the locale of the cut-off corners of the blank.

Other objects and features of this invention will more fully appear from the following detailed description taken in connection with the following drawings which illustrate a single embodiment of the invention, and wherein:

FIGURE 1 is a generally schematic view showing how interlocked staggered generally hexagonal cover blanks are cut from a common continuous strip of coiled stock;

FIGURE 2 is a fragmentary cross-sectional view showing the initial drawing step in the forming of a cover from one of the blanks illustrated in FIGURE 1;

FIGURE 3 is a fragmentary cross-sectional view similar to FIGURE 1 but illustrating a forming restrike operation to provide an annular hollow flange on the cover blank;

FIGURE 4 is a fragmentary cross-sectional view similar to FIGURE 3 illustrating the trimming operation;

FIGURE 5 is a fragmentary plane view of the structure shown in FIGURE 4 but illustrating the spaced sets of fingers provided in the trimming operation;

FIGURE 6 is a fragmenntary cross-sectional view similar to FIGURE 4 showing a second drawing operation to form the fingers;

FIGURE 7 is a fragmentary cross-sectional view similar to FIGURE 6 but showing the so-called collapsing or cam restrike operation to bring the cover flange over the fingers to conceal same;

FIGURE 8 is a fagmentary cross-sectional view similar to FIGURE 7 showing the final restriking operation in the shaping of the hollow peripheral margin of the cover;

FIGURE 9 is a fragmentary edge view or elevation of the cover shown in FIGURE 8, FIGURE 10 is a fragmentary front view of the cover as applied to a wheel; and FIGURE 11 is a fragmenntary cross-sectional view taken on line XI—XI of FIGURE 10 looking in the direction indicated by the arrows and showing the manner in which the peripheral portion of the cover, including the fingers, retainingly cooperates with the rim of the wheel.

As shown on the drawings:

The reference character 10 designates generally a strip of material from which identical wheel cover blanks 11 are to be formed in accordance with the method of this invention. This strip may be of any suitable material, such as is commonly used in the manufacture of wheel covers and as referred to in Lyon method Patent 2,707,449. In the large production of wheel covers for use on automobile wheels, it is common practice to use coils of metal stock or stripping, such for illustration as coils of stainless steel sheeting. Such steel possesses the requisite resilient and rigid characteristic required for the efficient retention of the cover on a wheel.

The successful manufacture on a competitive basis requires that the cost of the material going into the cover be kept at a minimum, and to that end it is highly desirable to reduce, as much as possible, the left over waste which has only a nominal scrap value. It has been found that material costs can be substantially reduced by blanking two staggered rows of polygonal blanks 11 from a common strip, and in which the blanks are interengaged so to speak. As shown, each blank 11, sheared or punched from the strip 10, is generally of a hexagonal shape having its corners or apices cut off. Any suitable metal stamping or shearing mechanism may be employed.

In this operation, two rows of blanks are cut along zigzagged lines 12 through the medial portion of the strip 10 to form confronting sides of longitudinally staggered and interlocked blanks in the two rows shown in FIGURE 1. Also, at the peaks of the staggered line 12, I provide cut-off corners or flats 13 by notching out of the blank two rows of longitudinally staggered triangular pieces 14.

In addition, the blank is cut transversely along staggered lines 15—15 to provide transverse sides of the blanks. It will be noted from FIGURE 1 that each of these transverse staggered cuts extend only part way across the blank from opposite sides of the zigzag line 12.

To form the remaining sides of each of the blanks at the edges of the strip, the opposite edges of portions 16 are notched or cut therefrom, each portion 16 on one edge being longitudinally staggered with respect to a portion 16 on the other edge. Each of these notched out portions include an angled or tapered point 17 which intercepts an outer end of a transverse line of cut 15, and which tapered point 17 forms the flats 13 on the confronting blank sides at the edges of the strip 10.

It will also be perceived that on each edge the notched out portions 16 are spaced from each other a distance so as to provide the outermost flats or cut-off corners of the blanks along that edge. In this way, I am enabled to use the least parts of the edges of the blank to form some of the flats 13 without having to cut off any material or corners at such particular flats.

Since all of the sides of each blank are identical, I am using the numeral 18 to designate each and all of such sides. It is clear that for all intents and purposes each blank is generally of a hexagonal shape with cut-off corners or apices defined by six flats 13 in each blank. As illustrated, the corner flats 13 are much shorter than the sides or edges 18. As shall appear more fully hereinafter, six groups of cover retaining fingers are formed in each blank, one at the locale of each of the cut-off corners or flats 13.

The blanks 11 thus formed, as shown in FIGURE 1, result in a minimum amount of waste, comprising only the triangular pieces 14 and the notched out portions 16. This is quite a saving over the waste that would be encountered in the use of square blanks where a multiple of corners have to be cut off in each piece going to make up a blank. Also, there is no waste along the zigzag line 12 or the transverse lines of cut 15—15, other than small pieces 14.

The blanks cut in accordance with the method illustrated in FIGURE 1 are each then subjected to a drawing operation to provide the dished structure 20 illustrated in FIGURE 2 which has a straight annular flange portion 21. The dished central portion of this cover may be of any suitable or ornamental appearance as desired.

Subsequent to the initial draw, and as shown in FIGURE 3, the dished structure is subjected to a forming and restrike operation resulting in the contoured shape 22. In this forming operation the central dished portion is given substantially its final contour and the peripheral flange is folded upon itself as indicated at 23 leaving a smaller flat peripheral portion 24 offset toward the back or base of the cover.

Nextly, the structure 22 (FIGURE 4) is trimmed and cut at 25 at its outer peripheral flange to provide a series of six groups of fingers 26, there being one for each corner or flat area 13 of the blank 11 from which the cover is being stamped (FIGURE 5).

Then the cover structure 22 is subjected to a second draw (FIGURE 6) which results in the portion 24 carrying the fingers 26 being drawn axially toward the base or bottom of the cover and causing the finger extremities 26 to be bent upon themselves at 27 and radially outwardly into short extremities.

In order to increase the overall diameter of the cover and to locate retaining finger extremities 27 in concealed relation to the margin to the cover, the structure 22 is next subjected to a collapsing operation. Any suitable die or cam restrike mechanism may be employed for this purpose. It results in the turned margin 23 of the cover being collapsed or bent radially outwardly at 28 as shown in FIGURE 7.

The final operation is illustrated in FIGURE 8 which comprises principally a restriking of the drawn structure 22 to open up and shape its turned margin 28. This provides the cover with a wheel engaging edge 29 with the fingers 26 and their turned extremities in proper angular relationship therewith for engaging the tire rim of the wheel as shall now be discussed.

The finished dished cover 22 of FIGURE 8 is illustrated in side elevation in FIGURE 9 in which two sets of fingers 26 are illustrated. It will also be perceived that the flange 23 between the fingers is cut out along a straight line 30. In other words, there is a minimum cutting out of material between the groups of six fingers so that a maximum amount of metal is present in the flange 23. This provides a relatively rigid back up for the fingers 26 when the extremities 27 engage the tire rim 31 as shown in FIGURE 11.

FIGURES 10 and 11 illustrate the wheel cover structure 22 in retaining cooperation with a multiple flange wheel rim 31 carried on the usual central wheel spider 32. This rim 31 is of a so-called dropped center type and carries a tire 33 in the usual way.

In the application of the cover structure 22 to the wheel rim 31, it is pressed axially inwardly against the tire rim resulting in the resilient flexing inwardly of the groups of fingers 26 as their extremities 27 engage and slide along the tire rim. The equal spacing of the six groups of fingers 27 plus the relatively deep flange portions at 30 (FIGURE 9) enable a relatively equal distribution of the stress set up in the pushing of the cover onto the wheel. This not only minimizes the likelihood of the cover going off center on the wheel but also lessens the chance of the flange 23 at the areas 30 collapsing or buckling. The arrangement is such that there is more metal available in the flange 23 to rigidify same and resist buckling, but at the same time not hinder proper flexing and yielding of the fingers 27 as they are cammed into retaining engagement with the tire rim 31.

It will be understood that the terms wheel trim are generic to both full wheel disk and ring covers, as this invention is equally applicable to both since the center of the blanks can be cut out if rings are desired.

Although minor modifications might be suggested by those versed in the art, it should be understood that I wish to embody within the scope of the patent warranted thereon, all such embodiments as reasonably and properly come within the scope of my contribution to the art.

I claim as my invention:

1. In a method of forming wheel trim or cover members, the steps of:
   cutting from sheet resilient material a plurality of abutting blanks of generally polygon shape with cut-off corners of minor length and straight edges of substantially greater length joining adjacent ones of the cut-off corners of each blank, the mutually facing edges of abutting blanks being formed by a single straight cut so as to minimize waste,
   and forming the peripheral portion of each blank into an underturned continuous flange having as many circumferentially equally spaced-apart groups of generally radially outwardly inclined cover retaining fingers as there are cut-off corners with each group located at a respective one of said cut-off corners and relatively deep flange portions having substantially uniform axial depth interconnecting adjacent ones of said groups, said forming of the peripheral portion including drawing and trimming operations,
   the equal spacing between said groups and the deep flange portions providing relatively uniform stress distribution throughout the peripheral portion when the wheel trim or cover member is mounted upon a wheel.

2. The method of claim 1 further characterized by forming staggered hexagonal blanks and forming the peripheral portion with six equally spaced-apart groups of fingers.

3. The method of claim 2 further characterized by the cutting out of relatively small triangular sections of the sheet resilient material to form the cut-off corners of abutting blanks.

References Cited

UNITED STATES PATENTS

| | | | |
|---|---|---|---|
| 420,524 | 2/1890 | Wheeler | 113—116 |
| 1,475,551 | 11/1923 | Overbury | 83—41 |
| 1,849,779 | 3/1932 | Zimmerman | 83—46 |
| 1,973,863 | 9/1934 | Betjeman | 83—43 |
| 2,343,253 | 3/1944 | Clark | 113—116 |
| 2,378,041 | 6/1945 | Sebell | 113—116 |
| 3,056,367 | 11/1962 | Lyon | 113—116 |
| 3,108,367 | 10/1963 | Christman | 72—338 X |
| 3,103,194 | 9/1963 | Frame | 113—116 X |

LOWELL A. LARSON, Primary Examiner

U.S. Cl. X.R.

72—379; 113—116